Feb. 18, 1964 A. ZARCHIN 3,121,626
APPARATUS FOR SWEETENING WATER
Filed Oct. 8, 1956 3 Sheets-Sheet 1

INVENTOR.
ALEXANDER ZARCHIN
BY Mock & Blum
ATTORNEYS

Feb. 18, 1964  A. ZARCHIN  3,121,626
APPARATUS FOR SWEETENING WATER
Filed Oct. 8, 1956  3 Sheets-Sheet 2
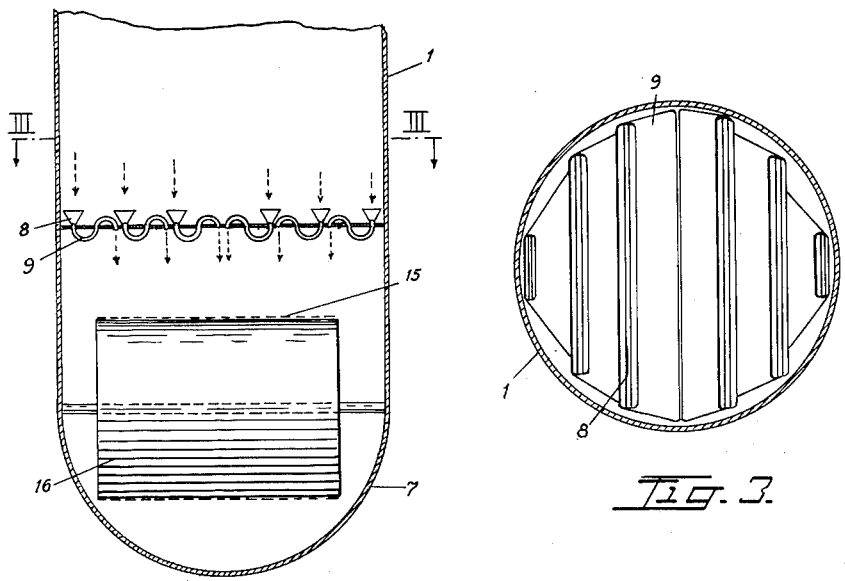
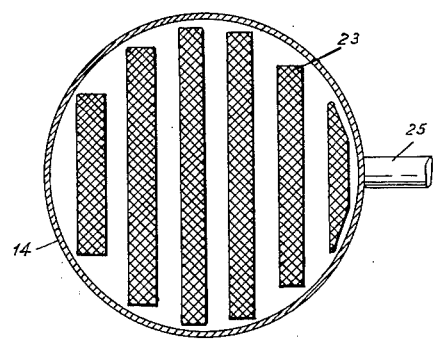
INVENTOR.
ALEXANDER ZARCHIN
BY
ATTORNEYS Feb. 18, 1964 A. ZARCHIN 3,121,626
APPARATUS FOR SWEETENING WATER
Filed Oct. 8, 1956 3 Sheets-Sheet 3

INVENTOR.
ALEXANDER ZARCHIN
BY Mocker Blum
ATTORNEYS

United States Patent Office 3,121,626
Patented Feb. 18, 1964

3,121,626
APPARATUS FOR SWEETENING WATER
Alexander Zarchin, 26 Sirkin St., Tel Aviv, Israel, assignor of fifty percent to the State of Israel, Ministry of Development, Jerusalem, Israel
Filed Oct. 8, 1956, Ser. No. 614,751
Claims priority, application Israel Oct. 18, 1955
12 Claims. (Cl. 62—58)

This invention relates to apparatus for sweetening water, especially sea water, brackish ground water, industrial brines or other waste liquors, in order to render it fit for use as drinking water or for other domestic, agricultural or industrial uses. The term "sweetening" is to be understood both in the accepted narrower sense and also in an extended sense, as the invention may be used for freeing crude water not only from mineral solutes but also from dissolved organic matter, e.g. in the case of waste liquors of the fruit juice or sugar industries.

It is known that the freezing of a dilute aqueous solution of salts or of organic matter such as sugar, yields as a rule at first substantially pure water ice while the solutes concentrate in the residual not-frozen liquid, and only when the concentration of the solutes in the residual liquid has progressed to a certain magnitude, dependent on the nature of the solutes, no more pure water ice but a cryohydrate separates. The freezing operation can, therefore, be so directed as not to proceed beyond the separation of pure water ice. Processes based on this behaviour of aqueous solutions have already been used or suggested for various commercial purposes, either with a view to obtaining a more highly concentrated product by the removal of excess water, e.g. fruit juice concentrates, or in order to produce pure water ice while the more highly concentrated residual solution is rejected.

These known processes necessitate extraneous refrigeration by means of refrigerating machinery which requires heavy capital investment and is expensive to operate. For the manufacture on a large scale of sweetened water for use as drinking water or for domestic, agricultural or industrial purposes, which must be cheap, extraneous refrigeration is too expensive.

It is, therefore, an object of this invention to provide a apparatus for sweetening water by freezing without extraneous refrigeration.

The invention consists in a continuous process for sweetening water, wherein solute-containing crude water, pre-cooled to a temperature near its freezing point, is continually introduced into a vacuum space where a portion of the water is evaporated under substantially adiabatic conditions, another portion thereof is thereby frozen to substantially pure water ice, and the residual crude water is converted into a more highly concentrated mother liquor; the produced water vapour on the one hand, and the mixture of ice and mother liquor on the other hand, are separately withdrawn from said vacuum space; the ice is separated in vacuo from the mother liquor, the latter is withdrawn, and the ice is contacted in vacuo with said water vapour at a temperature above but near the temperature of the water vapour within said vacuum space, whereby the vapour is condensed and the ice melted, to form together the desired sweet-water; and the latter as well as the withdrawn mother liquor are brought to heat-exchange with the incoming crude water for pre-cooling the latter.

The cold required for freezing some of the water is thus provided by the evaporation of another portion of the water. As at the freezing temperature of the crude water the heat of vaporization of water is nearly 600 cal., and the heat of fusion of the ice is about 80 cal., the evaporation of each kilogram of water produces about 7.5 kg. of ice.

In the entire apparatus required for carrying out the process, substantially adiabatic conditions will be maintained by appropriate heat-insulation of all vessels and conduits. The process can thus be kept in a state of substantial thermal balance, and its energy requirements can be covered by the supply of mechanical or electric power for the operation of vacuum and feed pumps, blowers and the like, or in the form of heat for the operation of steam ejectors, as will be described below. The maintenance of the thermal balance will involve proper adjustment of the rate of feed of the crude water, of the magnitude of vacuum, of the rate of withdrawal of water vapour from the evaporation-freezing stage, of the relative proportions of frozen water and residual liquor produced, of the rate of heat-exchange for pre-cooling the supply of crude water, and possibly of other factors which will readily occur to the skilled operator. In principle the vacuum in the evaporation space should correspond to the vapour pressure of the water at its freezing temperature in said space. For example, if the water to be sweetened is sea water with an initial freezing point of about $-4°$ C., the vacuum in the evaporation space should be of the order of 3 to 4 mm. Hg.

As the entry of some heat into the system ("loss of cold") is unavoidable, not all the vapour withdrawn from the evaporation stage is subsequently condensed in contact with the ice separated from the mother liquor. The excess of vapour is then condensed in a subsequent stage by renewed contact with the sweet-water, equally in vacuo.

The invention also consists in an apparatus for carrying out the process aforesaid, which apparatus comprises an evaporator, an ice collecting vessel and a melting vessel connected in series and being heat-insulated; means for feeding crude water into the evaporator; means for separately withdrawing from the evaporator on the one hand water vapour, and on the other hand a mixture of ice and mother liquor; means for separating the ice from the mother liquor in the ice collecting vessel, withdrawing from the latter the mother liquor, and transferring the ice to the melting vessel; means for contacting the ice in the melting vessel with water vapour previously withdrawn from the evaporator; means for withdrawing sweet-water from the melting vessel; means for producing a state of reduced pressure in the evaporator, ice collecting vessel and melting vessel; and a heat exchanger for pre-cooling the crude water by the mother liquor and sweet-water withdrawn from the ice collecting and melting vessels, respectively.

In order to facilitate the evaporation of water in the evaporator it is advantageous to spread the incoming cooled crude water so as to enlarge the evaporation surface. This may be done, for example, by providing filling bodies in the evaporator. It is, however, preferred to atomize the incoming water, e.g. by means of a spray head.

The evaporator, ice collecting vessel and melting vessel are preferably disposed at different levels so that the mixture of ice and mother liquor can descend by gravity from the evaporator into the ice collecting vessel, and the ice separated from the mother liquor can descend by gravity from the ice collecting vessel into the melting vessel. Means for preventing the passage of water vapour from the evaporator into the ice collecting vessel may be provided, e.g. a partition wall carrying one or more overflow pipes so shaped, e.g. in the form of swan-neck tubes, that they always contain an amount of mixture of ice and mother liquor, which constitutes a liquid seal.

The ice collecting vessel is preferably oblong-tubular and disposed in substantially horizontal position. The evaporator may be an upright vessel, e.g. a cylinder, carried by the top face of the collecting vessel at one end thereof, and the melting vessel may similarly be an upright vessel, e.g. a cylinder, projecting downwards from the underside of the collecting vessel at the other end thereof. The ice collecting vessel may contain filtering means serving at the same time as ice path or carrier, e.g. a chute or a belt conveyor made from wire meshing, coarse fabric or the like. This allows the mother liquor to filter through in order to be drained out of the collecting vessel, while the ice slides or is carried onward towards the melting vessel into which it drops at the end of the chute or conveyor.

The apparatus may also include a condenser designed to condense any amount of water vapour in excess of the amount condensed in the melting vessel. This is preferably a barometric condenser whose tail pipe dips into the sweet-water receiving tank. The condenser is connected to the melting vessel on the one hand by the sweet-water delivery pipe which passes through a heat exchanger in order to participate in the pre-cooling of the crude feed water, and on the other hand by a water-vapour conduit which includes a blower, steam ejector or the like pump.

The invention is illustrated, by way of example only, in the accompanying drawings in which:

FIG. 2 is a vertical section of a detail on line II—II of FIG. 1;

FIG. 3 is a cross-section on line III—III of FIG. 2;

FIG. 4 is a cross-section on line IV—IV of FIG. 1;

Figure 1:
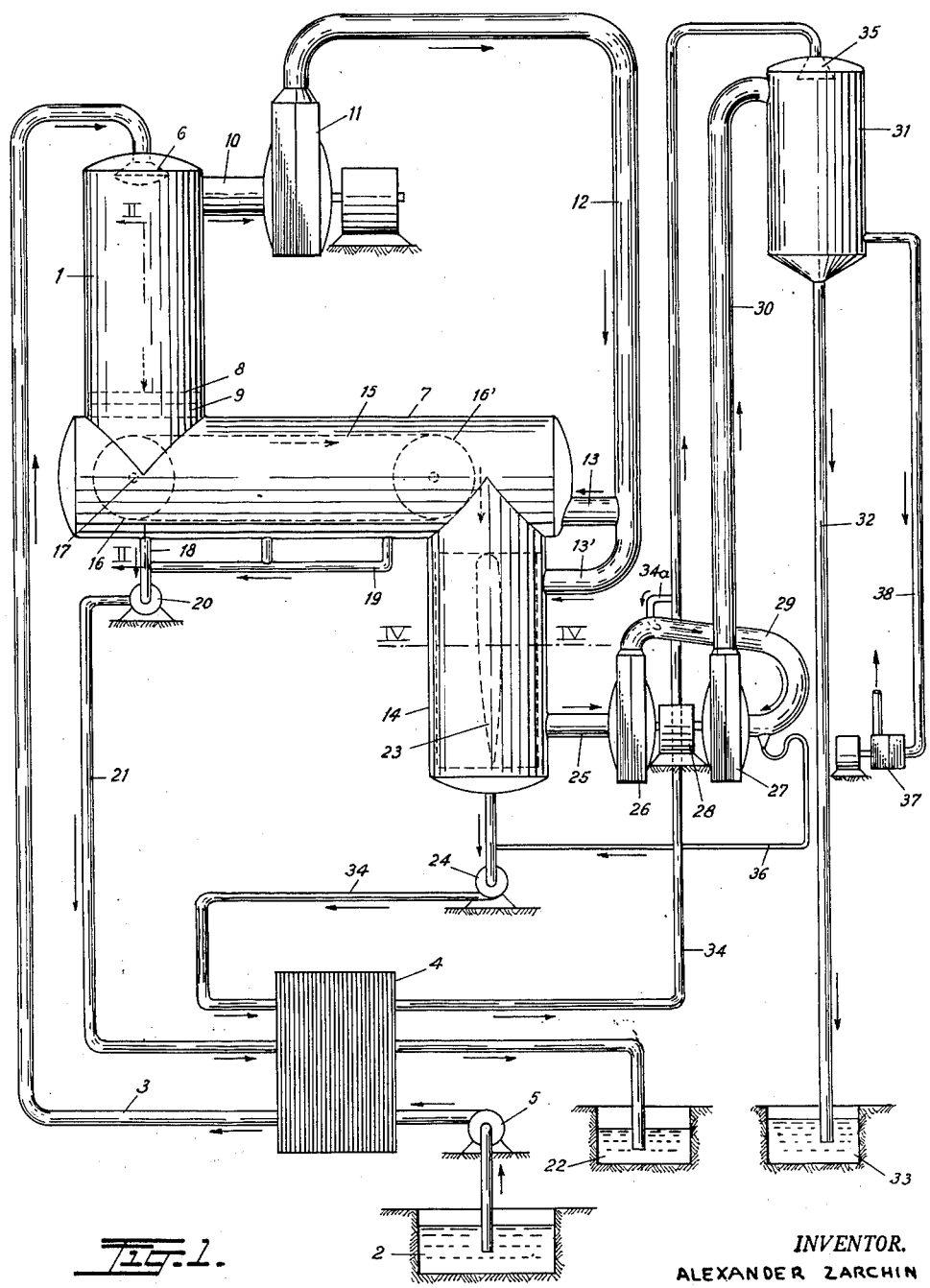
FIG. 1 is a diagrammatic elevational view of a water-sweetening apparatus according to the invention.

The water-sweetening apparatus according to FIGS. 1 to 4 comprises a crude-water tank 2 connected by a feed conduit 3, which includes a feed pump 5 and passes through a heat exchange 4 to a spray head 6 disposed in the top part of an upright tubular, e.g. cylindrical, evaporator 1. The evaporator opens at its base into one end of a substantially horizontal tubular, e.g. cylindrical, ice collecting vessel 7. The evaporator and ice collecting vessel are designed as vacuum vessels and are well heat-insulated. By the evaporation of a small portion of the incoming pre-cooled water under as nearly adiabatic conditions as possible, a larger portion of the incoming water is frozen while yet another portion thereof remains liquid and constitutes a mother liquor or brine containing all the solutes of the total amount of the crude water fed into the evaporator.

A liquid seal in the transition between the evaporator 1 and ice collecting vessel 7 is constituted by a number of siphon-like swanneck oblong overflow tubes or troughs 9 having inlets 8 which are disposed in parallel to one another and supported on a suitable base (FIGS. 2 and 3). These allow the ice-brine slush but not the water vapours to pass from hte evaporator into the ice collecting vessel.

The end of the ice collecting vessel opposite the evaporator merges at the bottom into an upright tubular, e.g. cylindrical, melting vessel 14 which is also heat-insulated. The ice collecting vessel 7 encloses a conveyor belt 15 extending from beneath the evaporator to above the melting vessel and running over rollers 16, 16'. The axle 17 of the roller 16 projects tightly, e.g. through a gland, out of the ice collecting vessel and is connected to a suitable drive. The conveyor is made from coarse fabric, wire mesh or any other suitable material retaining the ice but allowing the not-frozen brine to percolate. For the collection of the unfrozen brine, drain pipes 18 are provided at the bottom of the ice collector. They open into a header 19 connected via a pump 20 and a pipe 21, which passes through the heat exchanger 4, to a drain or a brine tank 22.

A vapour discharge pipe 10 leads from the top part of the evaporator to a blower 11 whose delivery pipe 12 is connected by a branch 13 to the end of the ice collecting vessel 7 above the melting vessel 14, and by a branch 13' to the upper part of the melting vessel. The melting vessel is so designed that the ice dropping into it from the collecting vessel 7 is loosely piled up in the melting vessel and the vapours entering through branches 13, 13' can circulate between the ice particles in contact with as large a surface area thereof as possible. For example, one or more upright wire-mesh pockets 23 (see also FIG. 4) may be disposed in the melting vessel. The ice drops into the spaces between these pockets while the vapour enters the pockets and from there spreads through the ice.

The base of the melting vessel 14 is connected via a pump 24 to a sweet-water delivery pipe 34 which passes through the heat exchanger 4 and ends in a spray head 35 disposed in the top part of a heat-insulated barometric condenser 31. Also connected to the lower part of the melting vessel 14 is the suction pipe 25 of the first-stage unit 26 of a two-stage blower 26, 27 mounted on the shaft of a motor 28. The delivery duct 29 of the first-stage unit 26 leads to the intake side of the second-stage unit 27, and a branch 34a connects the sweet-water delivery pipe 34 with the delivery duct 29. A drain 36 leads from the duct 29 to the pump 24.

The tail pipe 32 of the barometric condenser 31 opens into a sweet-water tank 33. Moreover, the condenser is connected by a suction pipe 38 to a power-operated vacuum pump 37 which, through the condenser and pipe 30, and with the cooperation of the blower 26, 27, produces a state of reduced pressure also in the melting vessel 14, ice collecting vessel 7 and evaporator 1.

In addition to the evaporator, ice collecting vessel, melting vessel and condenser, also all conduits of the apparatus are heat-insulated with a view to preventing as far as possible any exchange of heat between the surrounding atmosphere and the liquids and vapours circulating through the apparatus.

The apparatus described above works as follows:

While the vacuum pump 37 runs and maintains in the whole apparatus a vacuum which amounts to about 3–4 mm. Hg in the evaporator, the crude water, e.g. sea water containing about 3.5% by weight of salts, is pumped from the tank 2 into the evaporator 1 and is cooled on its way to about $-1°$ C. by the heat exchanger 4. As the water is sprayed out by the spray head 6 into the evaporator, about 7% by weight of the water evaporates under substantially adiabatic conditions whereby about 43% by weight are frozen, while the entire salt concentrates in the remaining about 50%. This brine or mother liquor, whose salt contents have risen to about 7% by weight, does not freeze. With the salt concentration indicated above the freezing temperature of the incoming water is about $-4°$ to $-5°$ C. The frozen portion should theoretically be pure water ice. In practice, some salt is mechanically retained therein but the proportion thereof stays well within the limits admissible for water destined for drinking, domestic or agricultural purposes.

The water vapours formed in the evaporator are drawn off by the blower 11 and discharged into the pipe 12. The slushy mixture of ice and brine drops into the ice collecting vessel 7 through the overflow siphon tubes 9 in which it forms a liquid seal, preventing vapours to pass into the ice collecting collector in this way.

In the ice collecting vessel the mixture is taken up by the conveyor 15 which carries the ice towards the melting vessel and at the same time filters it. In the left-hand part of vessel 7 the filtrate is formed by the brine. As the ice proceeds on the conveyor to the right, some vapour, entering through the branch 13, condenses in contact with the ice and the water thereby formed from the vapour and some melted ice washes the remaining ice substantially free from adhering brine. The aggregate filtrate of brine and washings runs off through the drains 18—19 and is pumped by the pump 20 through the heat exchanger 4 into the waste-liquor tank 22, or simply into a drain.

As the ice drops from the conveyor 15 into the melting vessel 14 it is contacted with the vapour delivered by the blower 11 through the pipe 12 and the branches 13, 13'. The vapour has been slightly warmed, say to about 0° to +1° C., by the action of the blower, while the temperature of the ice has also somewhat risen during the transport from the evaporator to the melting vessel and is now about 0° or very little below 0° C. Therefore, the large amount of heat liberated by the condensation of the small proportion of vapour is sufficient to bring about the melting of the entire, much larger proportion of ice.

The sweet-water thus produced from the aggregate amounts of vapour and ice is pumped by the pump 24 through the pipe 34 into the condenser 31, passing on its way through the heat exchanger. In the condenser it is atomized by the spray head 35. Finally it collects on the bottom of the condenser and descends through the tail pipe 32 to the sweet-water tank 33.

It is thus seen that the apparatus according to the invention is operated without extraneous refrigeration. If the thermal balance were ideal, the total amount of vapour produced in the evaporator should condense in the melting vessel. Such a balance can, of course, not be maintained in actual practice, as some "loss of cold," i.e. access of heat, is unavoidable and some water vapour thus remains uncondensed in the melting vessel 14. This is sucked off by the two-stage blower 26, 27. The vapour delivered by the first-stage unit 26 to the second-stage unit 27 is contacted on the way with sweet-water drawn from the delivery pipe 34 through the branch 34a. A part of the vapour is thus condensed already between the two units 26, 27 and the condensate flows off through the pipe 36. The remainder is delivered through pipe 30 into the condenser 31 where it condenses in contact with the atomized sweet-water.

The apparatus can operate continuously for long periods of time without other interruptions than those required for maintenance and repair. If the operation is started for the first time, or re-started after an interruption, some heat has to be dispersed initially until the balanced evaporating-freezing-melting cycle establishes itself. This may be done, for example, in any of the following ways:

(a) The apparatus may be run without extraneous cooling, the full quantity of crude water being pumped into the evaporator and returning through the brine-draining system. Some evaporation takes place, and the water gradually gets cooler until ice starts forming in the evaporator 1;
(b) A charge of ice may be placed into the heat exchanger 4 and/or the melting vessel 14, which will be provided with suitable manhole covers or doors for this purpose;
(c) A cooling jacket may be provided round the evaporator, and be filled with a charge of ice;
(d) An auxiliary refrigerator of conventional design may be provided in conjunction with the evaporator or heat exchanger, and be run for some time while the operation of the plant is initiated.

Figure 5:
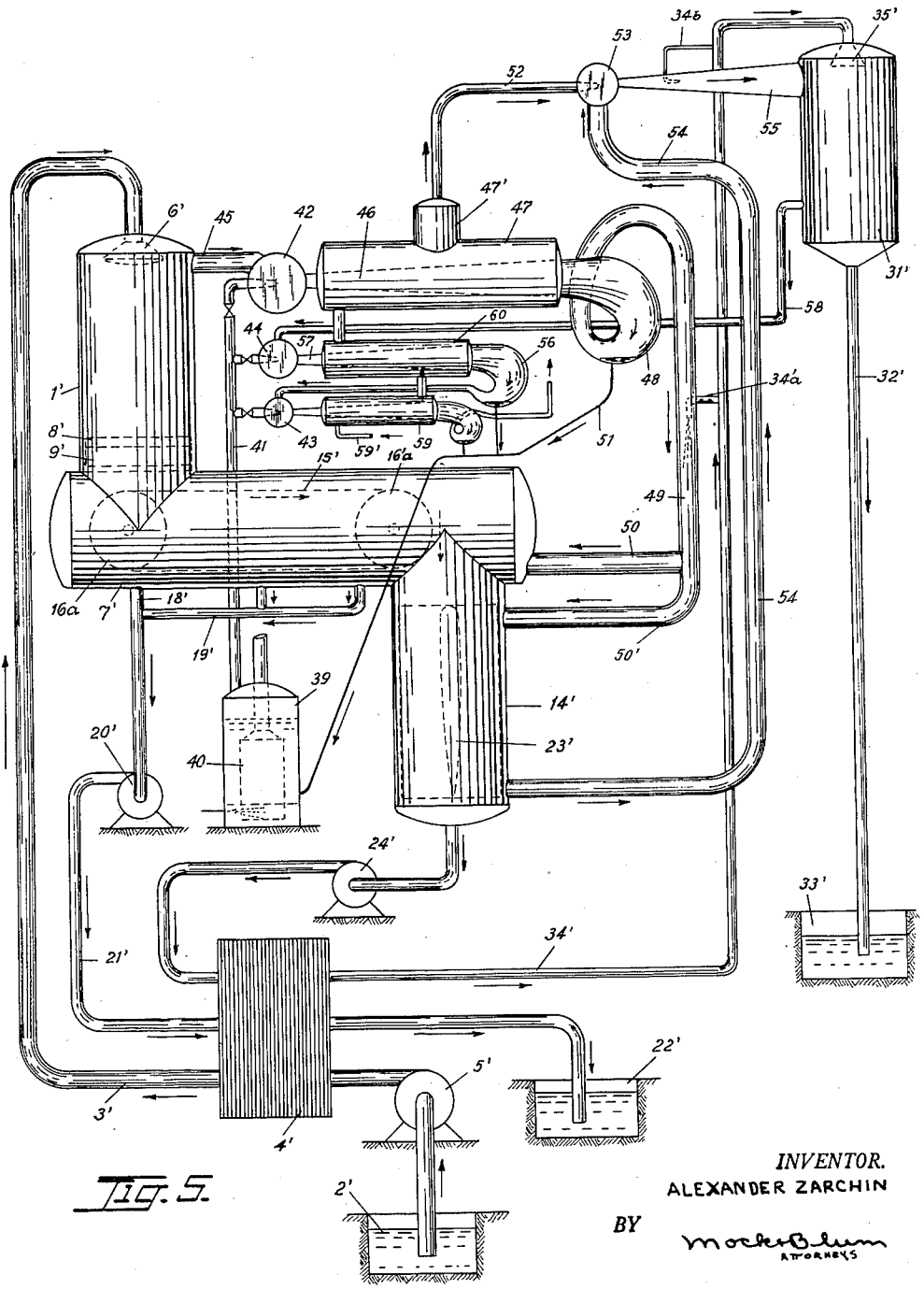
FIG. 5 is a representation, similar to FIG. 1, of a water-sweetening apparatus according to a second embodiment of the invention.

The embodiment of the invention shown in FIG. 5 comprises the same principal elements as the first embodiment, namely: crude-water tank 2', feed pipe 3', heat exchanger 4', feed pump 5', evaporator 1' with spray head 6' and liquid seal 8', 9', ice collector 7' including conveyor 15' with drums 16a and 16'a, drain pipes 18', header 19', waste-liquor pump 20', waste-liquor pipe 21' and tank 22'; melting vessel 14', sweet-water pump 24' and delivery pipe 34', barometric condenser 31', with spray head 35', and tail pipe 32', and sweet-water tank 33'.

However, the blowers and vacuum pump of the first embodiment are replaced by the following arrangement:

A mercury-steam generator 39, provided with suitable heating means 40, is connected by a rising pipe 41 to a steam ejector 42 as well as to the first-stage unit 43 and the second-stage unit 44 of a two-stage mercury-steam ejector vacuum pump.

The suction duct 45 of the ejector 42 is connected to the evaporator 1' while its jet duct 46 passes through a water boiler 47 and is continued thereafter by a section 48 coiled into a loop, and a delivery pipe 49 which is connected by branches 50, 50' to the end of the ice collector 7' opposite the evaporator 1', and to the upper part of the melting vessel 14', respectively. The sweet-water delivery pipe 34' is connected by a branch 34'a to the pipe 49. From the deepest point of the loop 48 a return pipe 51 leads back to the mecury-stream generator 39.

The steam dome 47' of the water boiler 47 is connected by a pipe 52 to an injector 53 whose suction duct 54 is connected to the melting vessel 14' while its jet duct 55 joins the top part of the barometric condenser 31'. The sweet-water delivery pipe 34' is connected by a branch 34b to the delivery duct 55.

The suction duct 56 of the first-stage unit 43 of the mercury-steam ejector pump is connected to the jet duct 57 of the second-stage unit 44, while the suction duct 58 of the latter is connected to the barometric condenser 31'.

The jet ducts of both stages of the mercury-steam ejector vacuum pump are enclosed in water jackets 59, 60 which are connected in series to one another and to the water boiler 47. The jacket 59 is fed with fresh cooling water through a conduit 59'. The water warmed in this jacket rises into the jacket 60 where it acts again as coolant and is still further heated. From the jacket 60 the hot water rises into the boiler 47 which it leaves as steam.

This apparatus works as follows:

The pumps 5', 20', and 24' and the mercury-steam generator 39 are in operation. The crude water is pumped from the tank 2' through the heat exchanger 4' into the evaporator 1' where a portion of the water is evaporated and another portion frozen, as described for the first embodiment. The ice drops onto conveyor 15' of the ice collecting vessel 7', the not-frozen brine is drained off and pumped by the pump 20' into the waste-liquor tank 22' or a drain, passing on its way through the heat exchanger 4'.

The water vapour produced in the evaporator 1' is aspirated by the ejector 42 through the duct 45 and delivered into the duct 46. The heat carried by the mercury steam is transferred by heat exchange to the water in the boiler 47, and the water steam thereby generated collects in the dome 47' and passes through pipe 52 to the injector 53. The cooled water vapour and condensed mercury in the duct 46 pass into the pipe loop 48, from which the condensed mercury returns through the pipe 51 to the generator 39. The water vapour, further cooled by sweet-water introduced into the pipe 50' through the branch 34a, is delivered into the ice collector 7' and melting vessel 14' and condenses in contact with the ice as described for the first embodiment, whereby the ice is melted. The sweet-water thus produced is pumped by pump 24' into the delivery pipe 34', passes through the heat exchanger 4' and flows into the barometric condenser 31'.

The water steam delivered by the boiler 47 into the injector 53 aspirates the not-condensed vapour from the melting vessel 14' through pipe 54 and delivers it through duct 55 into the condenser 31'.

What I claim is:

1. An apparatus for sweetening water, comprising an upright evaporator vessel opening at its base into an ice collecting vessel disposed at a lower level; means for producing a liquid seal in the passage between the evaporator and ice collecting vessel for allowing a mixture of ice and mother liquor to pass from the evaporator into the ice collecting vessel but preventing water vapour from thus passing; a melting vessel disposed at a lower level than the ice collecting vessel and connected to the latter laterally off the evaporator; a conveyor extending in the ice collecting vessel for receiving from the evaporator a mixture of ice and mother liquor, allowing the mother liquor to filter through, and dropping the residual ice into the melting vessel; means for feeding crude water into the evaporator; means for withdrawing water vapour from the evaporator and introducing it into the melting vessel; means for withdrawing mother liquor from the ice collecting vessel; means for withdrawing sweet-water from the melting vessel; means for pre-cooling the crude feed water by exchange of heat with the withdrawn mother liquor and sweetwater; a barometric condenser, means for separately introducing water vapour and sweet-water, separately withdrawn from the melting vessel, into the condenser; and means, directly connected to the condenser, for setting up a state of reduced pressure in the latter and consequently in the evaporator, ice collecting vessel and melting vessel.

2. An apparatus as claimed in claim 1, wherein the means for setting up a state of reduced pressure is a vacuum pump.

3. An apparatus as claimed in claim 2, wherein the vacuum pump is a power-operated pump.

4. An apparatus as claimed in claim 2, wherein the vacuum pump is a mercury-steam ejector pump.

5. An apparatus as claimed in claim 1, comprising a conduit extending from the upper part of the evaporator to the melting vessel and including means for aspirating water vapour from the evaporator and delivering it to the melting vessel.

6. An apparatus as claimed in claim 5, wherein the water-vapour aspirating and delivering means is a blower.

7. An apparatus as claimed in claim 5, wherein the water-vapour aspirating and delivering means is a mercury steam ejector.

8. An apparatus for sweetening water, comprising an evaporator, a substantially horizontal and tubular ice collecting vessel and a melting vessel connected in series and being heat insulated, said evaporator being mounted on the top side of the ice collecting vessel at one end thereof, said melting vessel being connected to the bottom side of said ice collecting vessel at the opposite end thereof; means for feeding crude water into the evaporator; means for separately withdrawing from the evaporator on the one hand water vapor, and on the other hand a mixture of ice and mother liquor; a liquid permeable conveyor within said ice collecting vessel for receiving from said evaporator a mixture of ice and mother liquor, allowing the latter to filter through said conveyor and transferring the residual ice to the melting vessel, said conveyor being an endless belt of liquid permeable material extending through the ice collecting vessel from beneath the evaporator to above the melting vessel; means for contacting the ice in the melting vessel with water vapor previously withdrawn from the evaporator; means for withdrawing sweet water from the melting vessel; means for producing a state of reduced pressure in said evaporator; means for producing a state of reduced pressure in said ice collecting vessel and said melting vessel; and a heat exchanger for pre-cooling the crude water by the mother liquor and sweet water withdrawn from the ice collecting and melting vessels respectively.

9. An apparatus for sweetening water, comprising an evaporator, an ice collecting vessel and a melting vessel connected in series and being heat-insulated; means for feeding crude water into the evaporator; means for separately withdrawing from the evaporator on the one hand water vapor, and on the other hand a mixture of ice and mother liquor; means for separating the ice from the mother liquor in the ice collecting vessel, withdrawing from the latter the mother liquor, and transferring the ice to the melting vessel; means for contacting the ice in the melting vessel with water vapor previously withdrawn from the evaporator; means for withdrawing sweet-water from the melting vessel; means for producing a state of reduced pressure in the evaporator; means for producing a state of reduced pressure in the ice collecting vessel and melting vessel; a heat exchanger for pre-cooling the crude water by the mother liquor and sweet-water withdrawn from the ice collecting and melting vessels, respectively; said apparatus further including a barometric condenser and a sweet water receiving tank, a tailpipe dipping from said condenser into said tank; means for feeding sweet water from the melting vessel into the condenser and means for feeding uncondensed water vapor from the melting vessel into said condenser.

10. An apparatus for sweetening water comprising an evaporator, a substantially horizontal and tubular ice collecting vessel, and a melting vessel connected in series and being heat insulated; said evaporator being mounted on the top side of said ice collecting vessel at one end thereof, said melting vessel being connected to the bottom side of said ice collecting vessel at the opposite end thereof; means for feeding crude water into said evaporator; means for separately withdrawing from the evaporator on the one hand water vapor, and on the other hand a mixture of ice and mother liquor; means for separating the ice from the mother liquor in the ice collecting vessel; means for withdrawing mother liquor from the latter and for transferring the ice from said ice collecting vessel to said melting vessel; means for contacting the ice in the melting vessel with water vapor previously withdrawn from the evaporator; means for withdrawing sweet water from the melting vessel, means for producing the state of reduced pressure in the evaporator; means for producing a state of reduced pressure in the ice collecting vessel and the melting vessel; and a heat exchanger for pre-cooling the crude water by the mother liquor and sweet water withdrawn from the ice collecting and melting vessels, respectively.

11. An apparatus for sweetening water, comprising an evaporator, an ice collecting vessel and a melting vessel connected in series and being heat-insulated; means for feeding crude water into the evaporator; means for separately withdrawing from the evaporator on the one hand water vapor, and on the other hand a mixture of ice and mother liquor; means for producing in the passage between said evaporator and said ice collecting vessel, a liquid seal adapted to let the mixture of ice and mother liquor pass, but to prevent the passage of water vapor, said liquid seal forming means comprising a partition wall extending across the passage between the evaporator and the ice collecting vessel, and at least one swanneck overflow tube disposed in the partition wall; means for separating the ice from the mother liquor in the ice collecting vessel, withdrawing from the latter the mother liquor, and transferring the ice to the melting vessel; means for contacting the ice in the melting vessel with water vapor previously withdrawn from the evaporator; means for withdrawing sweet-water from the melting vessel; means for producing a state of reduced pressure in the evaporator; means for producing a state of reduced pressure in the ice collecting vessel and melting vessel; and a heat exchanger for pre-cooling the crude water by the mother liquor and sweet-water withdrawn from the ice collecting and melting vessels, respectively.

12. An apparatus for sweetening water, comprising an evaporator, an ice collecting vessel and a melting vessel connected in series and being heat-insulated; means for feeding crude water into the evaporator; means for separately withdrawing from the evaporator on the one hand water vapor, and on the other hand a mixture of ice and mother liquor; means for separating the ice from the mother liquor in the ice collecting vessel, withdrawing from the latter the mother liquor, and transferring the ice to the melting vessel; means for contacting the ice in the melting vessel with water vapor previously withdrawn from the evaporator; means for withdrawing sweet-water from the melting vessel; a single vacuum producing means for producing a state of reduced pressure in said evaporator, ice collecting vessel and melting vessel; and a heat exchanger for precooling the crude water by the mother liquor and sweet-water withdrawn from the ice collecting and melting vessels, respectively.

References Cited in the file of this patent

UNITED STATES PATENTS

| | | |
|---|---|---|
| 2,009,283 | Warner | July 23, 1935 |
| 2,315,762 | Ax et al. | Apr. 6, 1943 |
| 2,419,881 | Borgerd et al. | Apr. 29, 1947 |
| 2,573,516 | Van Der Molen | Oct. 30, 1951 |
| 2,585,021 | Lessard et al. | Feb. 12, 1952 |

FOREIGN PATENTS

| | | |
|---|---|---|
| 985,905 | France | Mar. 21, 1951 |
| 744,430 | Great Britain | Feb. 8, 1956 |

OTHER REFERENCES

Publication, "The Pomona Progress Bulletin" of Thursday evening, March 10, 1955, article entitled "Pomona Man's Plan Converts Sea Water."

Hendrickson et al.: "Research and Development of Processes for Desalting Water by Freezing," United States Department of Interior Office of Saline Water Research and Development Progress Report No. 10, pages 102, 103 and 104, relied on, August 1956.